United States Patent [19]

Takahashi et al.

[11] 4,177,963
[45] Dec. 11, 1979

[54] CORD WINDING APPARATUS

[75] Inventors: Katsuhiko Takahashi, Tokorozawa; Masakazu Iikura, Tokyo; Hachiro Doi, Minamisaitama, all of Japan

[73] Assignee: Fuso Keigokin Co., Ltd., Tokyo, Japan

[21] Appl. No.: 919,842

[22] Filed: Jun. 28, 1978

[30] Foreign Application Priority Data

Sep. 26, 1977 [JP] Japan .............................. 52-115888

[51] Int. Cl.² ............................................. B65H 75/48
[52] U.S. Cl. ............................................... 242/107.11
[58] Field of Search ............ 242/107.1, 107.11, 107.12, 242/107.13, 107.14, 107.15, 86.1, 100.1, 86.4, 94, 107, 107.2, 107.3, 107.6, 107.7; 191/12.2 R, 12.4

[56] References Cited

U.S. PATENT DOCUMENTS

| | | | |
|---|---|---|---|
| 1,202,718 | 10/1916 | Holmes | 242/107.13 X |
| 2,052,341 | 8/1936 | Douglass | 242/107.11 |
| 2,518,072 | 8/1950 | Rushworth | 242/107.1 |
| 2,742,242 | 4/1956 | Godwin | 242/86.1 |
| 3,122,340 | 2/1964 | Gentile | 242/107.11 |
| 3,207,456 | 9/1965 | Hill | 242/94 |

FOREIGN PATENT DOCUMENTS 785339 10/1957 United Kingdom .................. 242/107.1

Primary Examiner—Harvey C. Hornsby
Assistant Examiner—John M. Jillions
Attorney, Agent, or Firm—Oblon, Fisher, Spivak, McClelland & Maier

[57] ABSTRACT

A cord winding apparatus for use in tautly winding and unwinding an electrical cord between an electro-motive apparatus and a power source. The cord winding apparatus includes a winding drum rotatably mounted and spring-connected to a drum shaft. An electrical power cord is folded into two pieces and attached to the drum such that the folded cord pieces wind from the same direction around the drum. A fixed arm is rigidly attached to the shaft to prevent shaft rotational movement. Front and rear cord guides are attached to the fixed arm to guide the cord pieces during winding and unwinding thereof around the drum. A pair of cup-like wheels are rotatably mounted on the shaft sandwiching the winding drum. The wheels carry the cord winding apparatus so that the winding drum can freely rotate about the shaft.

5 Claims, 6 Drawing Figures

CORD WINDING APPARATUS

BACKGROUND OF THE INVENTION

1. Field of the Invention

The present invention relates to a cord winding apparatus for use in conjunction with an electro-motive apparatus, which, while in use, trails a long cord.

2. Description of the Prior Art

A long cord, which connects an electro-motive apparatus such as vacuum cleaner with a power source, is necessary when the apparatus moves to every corner of a room or to a wide range of a field. Since the long cord is loosely lying on a floor, depending on the movement of the vacuum cleaner, or the like, there occur such inconveniences as the cord becoming entangled or in order to avoid entanglement, the cord is taken up and carried whenever the moving direction of the cleaner is changed, so as not to hinder the operator.

In order to remove such inconveniences, it has been proposed to incorporate a cord reel into the electro-motive apparatus. However, since the apparatus becomes bulky by the incorporation of a reel, its weight is increased and its handling its troublesome. Further, a slip ring is necessary for connecting an electric motor with the cord even though the ring is extremely poor in durability.

SUMMARY OF THE INVENTION

Accordingly, one object of this invention is to provide a novel cord winding apparatus which prevents cord entanglement and which does not hinder movement of an electro-motive apparatus.

Another object is to provide a novel cord winding apparatus which does not increase the size or weight of an electro-motive apparatus.

A further object of this invention is to provide a novel cord winding apparatus which requires minimal force during cord winding and unwinding.

Yet another object is to provide a novel cord winding apparatus wherein a long cord is easily and compactly stored when not in use.

Another object of this invention is to provide an novel cord winding apparatus for use with an electro-motive apparatus whereby the cord is wound and unwound depending on the movement of the electro-motive apparatus and is constantly stretched between the electro-motive apparatus and a power source.

These and other objects of the invention are achieved by providing a novel cord winding apparatus which includes a shaft, a winding drum rotatably mounted on the shaft, a cord folded into two pieces and connected to the drum at the cord folding point, the cord being wound around the drum such that the two folded cord pieces are wound from the same direction around the drum, and a spring connected to the shaft and the drum for stretching the cord pieces between the electro-motive apparatus and the power source and for rewinding the folded cord pieces. A fixed arm is rigidly connected to the shaft and prevents rotational movement thereof. The fixed arm is provided with cord guides for guiding the two folded cord pieces to and from the drum. A pair of cup-like wheels flank the sides of the winding drum and sandwich the drum therebetween.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
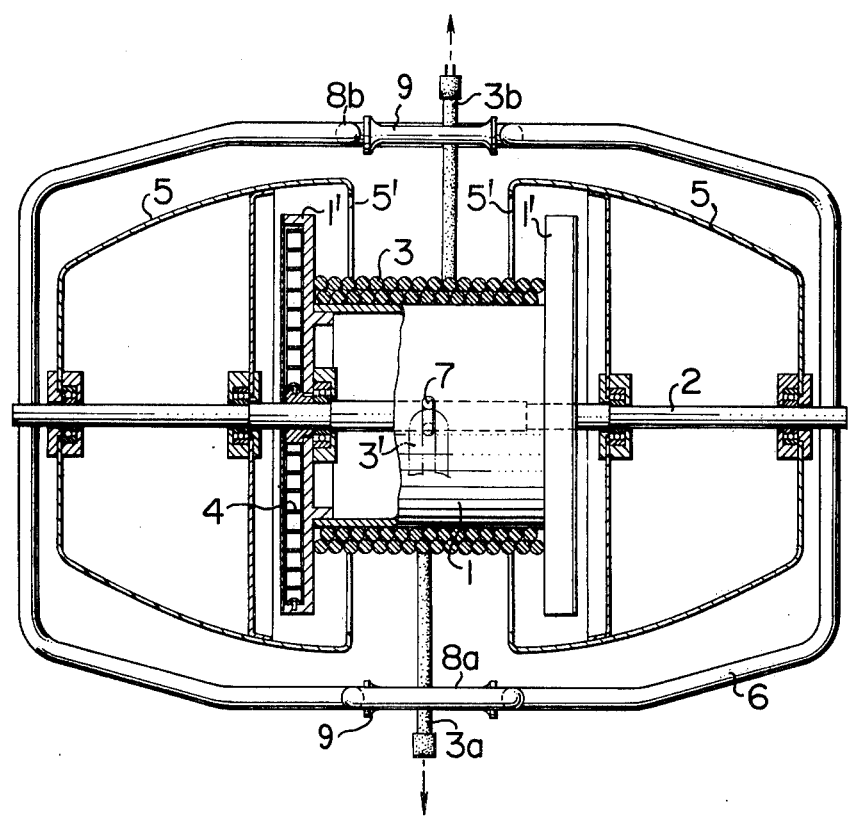
FIG. 1 is a plan view, partly cut out, of a preferred embodiment of the cord winding apparatus of the invention.

Referring now to the drawings, wherein like reference numerals designate identical or corresponding parts throughout the several views, and more particularly to FIG. 1 thereof, there is seen a winding drum 1 mounted rotatably around a support shaft 2 so that a long cord 3 winds around the drum 1. The cord 3 is folded in two pieces so that the two ends thereof wind to one direction. The drum 1 is connected to the shaft 2 by means of a spring 4 in such a manner that the drum is provided with a rotary power. The shaft 2 supports the drum 1 and the wheels 5, 5. To the shaft 2 is fixed a fixed arm 6 to the effect that the drum 1 can be rotated by the action of the spring 4. The spring 4 is provided around one of, or both of the flanges 1', 1' of the drum 1. One end of the spring 4 is fixed to the flange 1', and the other end of the spring is fixed to the shaft 2, of which rotation is restricted by the fixed arm 6, is connected with each other by the spring, the cord 3 which winds around the drum, is constantly tensioned in a winding direction.

The cord 3 is folded into two pieces so that the folded portion 3' is hooked by the hook 7 provided on the winding drum 1. The two pieces of thus folded cord wind to one direction. One end 3a connecting to the electro-motive apparatus A is introduced through a cord guide 8a provided on the fixed arm 6, the other end 3b is guided through a cord guide 8a so as to connect to the power source B.

Figure 2:
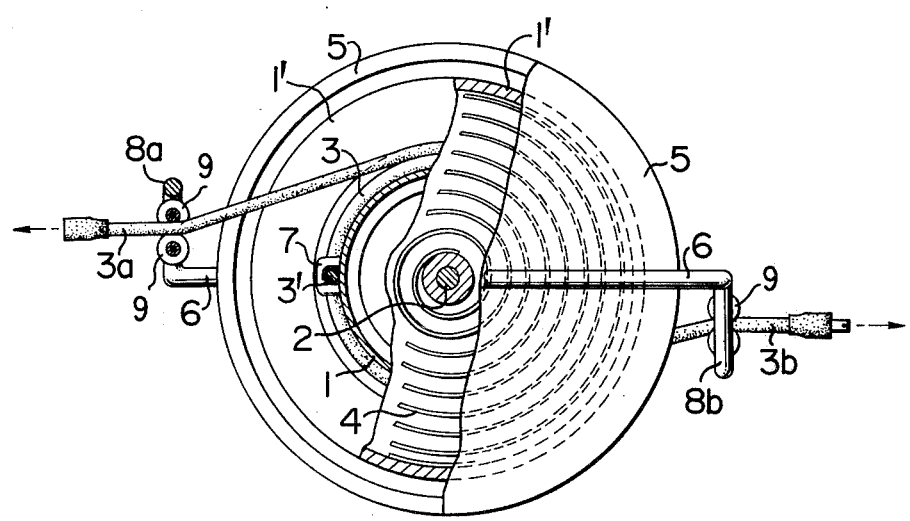
FIG. 2 is a side view, partly cut out, of the embodiment shown in FIG. 1.
Figure 3:
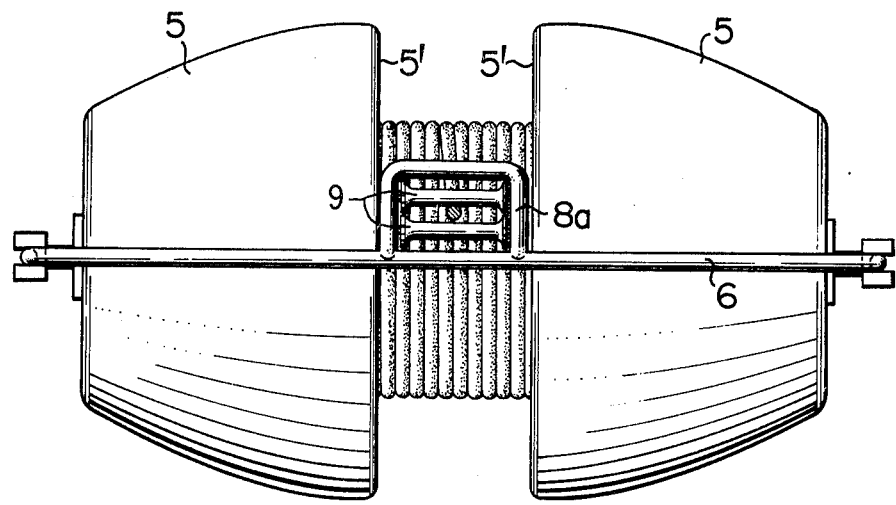
FIG. 3 is a plan view of the preferred embodiment.
Figure 4:
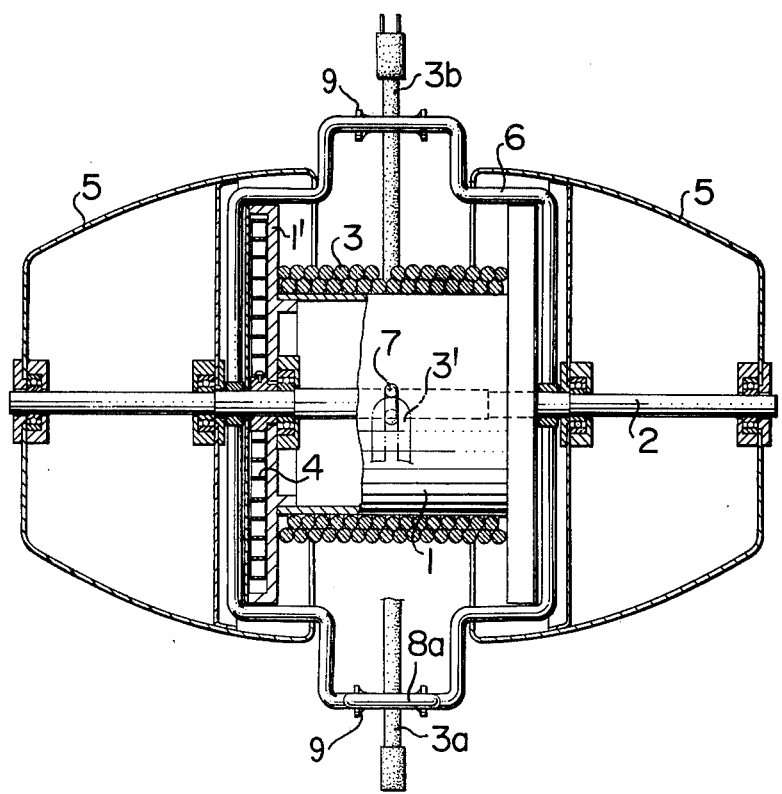
FIG. 4 shows a plan view, partly cut out, of another embodiment according to the invention.
Figure 5:
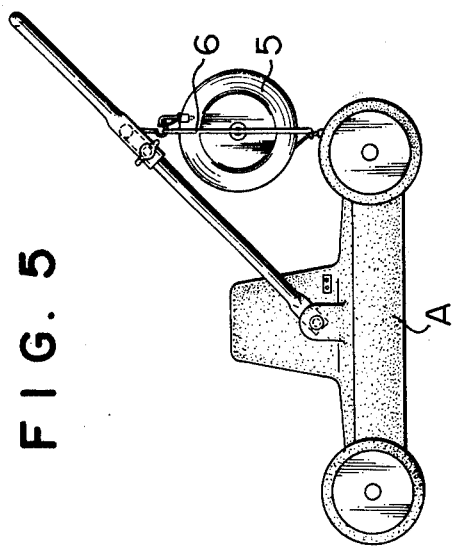
FIGS. 5 and 6 are side view of the embodiment showing utility of the apparatus according to the invention.

The fixed arm 6 prevents rotating movement of the support shaft 2. The arm 6 is formed into a ring shape surrounding the two wheels 5, 5, and is fixed to ends of the shaft 2, as seen in FIGS. 1 through 3, or in a ring shape extending between the two wheels 5, 5, as seen in FIG. 4. The arm may be formed into other than a ring shape, or may be projected from one wheel only. The cord guides 8a, 8b wich guide the respective end of the cord 3, are mounted to the center of the fixed arm 6, and guide the cord 3 during winding or unwinding. If necessary, conveyor rollers 9, 9 may be provided for conveying the cord 3.

Two sets of wheels 5, 5 carry the apparatus, and are mounted rotatably around the shaft 2, so that the winding drum 1 can rotate freely. Each of the wheels 5 is formed into a cup-like shape so that the apparatus supported by the wheels does not overturn. Further, the two wheels which are arranged to sandwich the drum 1, enhance the appearance of the apparatus of the invention.

The operation of the apparatus according to the invention is explained hereinafter.

Figure 6:
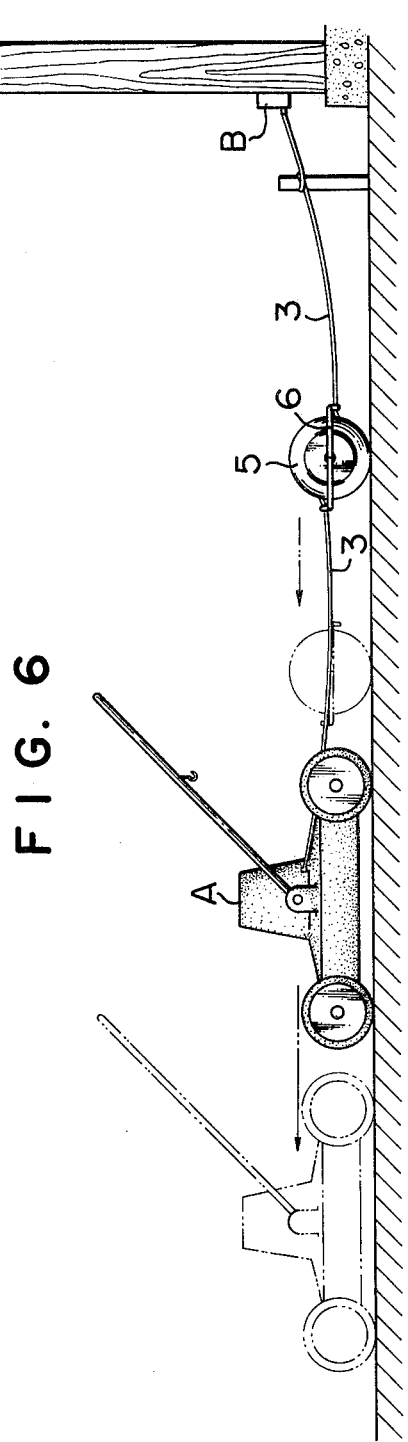

One end of 3a of the cord 3 is fed through a cord guide 8a, and is connected to an electromotive apparatus A, and the other end 3b of the cord is fed through the other end guide 8b and is connected to a power source B. When the apparatus A advances, as seen in FIG. 6, the cord 3 is stretched and the drum is rotated, overcoming the resistance of the spring 4. Accordingly, both ends of the cord 3 are unwound at a same amount to the apparatus side, and to the power source side, respectively. Further, the cord winding apparatus of the invention advances, in accordance with the advance of the electro-motive apparatus A.

When the electromotive apparatus A retreats, the drum 1 rotates by the action of the spring 4 so as to rewind the cord 3 at a length corresponding to the retreated distance of the apparatus A. Simultaneously with the rotation of the drum, the winding apparatus retreats following the retreat of the motive apparatus A.

As has been explained, the apparatus of the invention is always located in the middle portion between the electro-motive apparatus A and the power source B, and follows the move of the apparatus A. The cord 3 which is wound around the winding drum 1 is constantly stretched between the electro-motive apparatus A and the power source B, and is thus wound or unwound depending on the retreating or advancing movement of the apparatus A.

According to the invention, the cord is always maintained in a tight or stretched condition and, thus, it does not loosely lay on the floor. Accordingly, there is no need for taking up and carrying the cord whenever the moving direction of the electromotive apparatus changes. Further, the cord is wound around the winding drum automatically and compactly after the apparatus is used and, therefore, it is convenient for handling and storing of the apparatus A.

According to the invention, the long cord 3 is folded into two pieces so that the two pieces running from the folded position are wound to one direction around the drum and, therefore, work for the winding or unwinding operation is required only with regard to half the total length of the long cord. Thus, it is very convenient for handling a lengthy cord. Further, the acting force required of the spring is as well only a half of that required for the total cord.

If the wheels are made in the form of a cup, cap, or a cap-cylinder, the apparatus itself is not easily upset and easily follows the move of the electro-motive apparatus. In addition, the wheels provide a cover for the winding drum and therefore, the appropriately shaped cover promotes a good appearance for the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. A cord winding apparatus for use in connecting an electro-motive apparatus to a power source comprising:
   a shaft;
   a winding drum rotatably mounted on the sahft;
   a cord folded into two pieces and connected to the drum at the cord folding point, said cord being wound around the drum such that the two folded cord pieces are wound from the same direction around the drum;
   spring means connected to the shaft and the drum for stretching the folded cord pieces between the electro-motive apparatus and the power source and for rewinding the two folded cord pieces;
   a fixed arm rigidly connected to said shaft for preventing rotating movement of said shaft; and
   a pair of wheels flanking the sides of the winding drum so as to support said winding drum and which are mounted on said shaft so as to rotate independently of said winding drum, said wheels sandwiching the winding drum between the two wheels and each wheel having a substantially cup-like shape so as to stablize said cord winding apparatus.

2. A cord winding apparatus according to claim 1, wherein said fixed arm comprises:
   front and rear arm portions; and
   front and rear cord guides attached to said front and rear arms portions, respectively, for guiding the ends of said folded cord pieces to and from said winding drum.

3. A cord winding apparatus according to claim 1 further comprising a pair of flanges at opposite ends of said winding drum for limiting winding of said cord on said drum wherein said pair of wheels circumvent said pair of flanges.

4. A cord winding apparatus according to claim 1 wherein said fixed arm is ring-shaped and positioned so as to surround said two wheels.

5. A cord winding apparatus according to claim 1 wherein said fixed arm is ring-shaped and positioned so as to be disposed between said pair of wheels and said drum.

* * * * *